March 31, 1925.
R. R. THOMPSON
ELECTRIC MOTOR
Original Filed Nov. 22, 1919
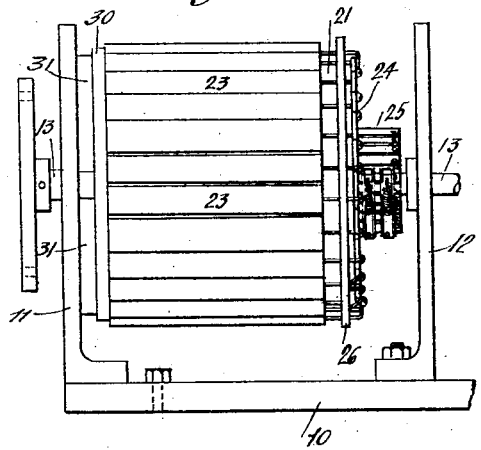
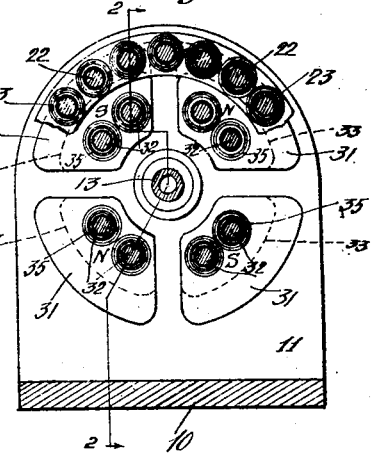
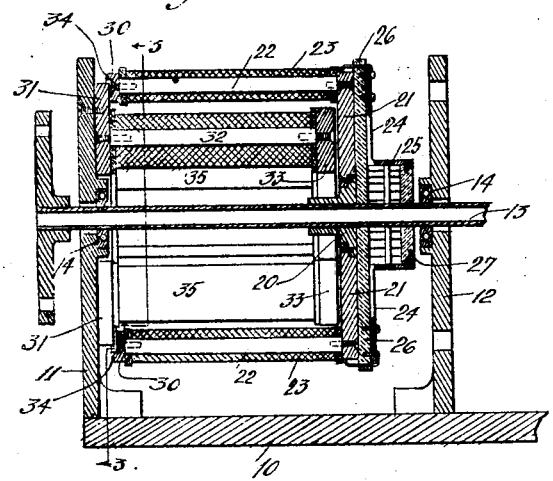
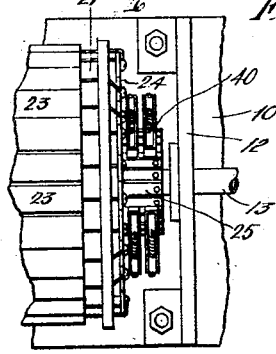
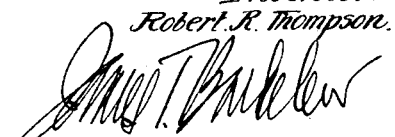
Inventor.
Robert R. Thompson.
Attorney.

Patented Mar. 31, 1925.

1,531,527

UNITED STATES PATENT OFFICE.

ROBERT R. THOMPSON, DECEASED; BY MARY W. THOMPSON, EXECUTRIX, OF LOS ANGELES, CALIFORNIA.

ELECTRIC MOTOR.

Original application filed November 22, 1919, Serial No. 339,788. Divided and this application filed July 14, 1921. Serial No. 484,687.

*To all whom it may concern:*

Be it known that I, MARY W. THOMPSON, a citizen of the United States, residing at Los Angeles, in the county of Los Angeles, State of California, am the executrix of the last will and testament of ROBERT R. THOMPSON, deceased, who did invent new and useful Improvements in Electric Motors, of which the following is a specification.

This invention relates in its broader aspects to improvements in electric motors of the rotating type; and more specifically to motors adapted for continued reversal of slow movement so as to effect a slow oscillatory motion. The specific form of the invention here illustrated and described is one particularly adapted for oscillatory movement of a signal; and its combination in a signal mechanism is described and claimed in the co-pending application Ser. No. 339,788, filed November 22nd 1919 for oscillating signals, of which this application is a division. But I wish it to be understood that the invention is not limited to such specific use or combination. In this present application I desire to claim the motor mechanism independently of combination with a signal mechanism; but, as the present specific embodiment of my motor invention has been particularly designed for operating the oscillatory signal, and as the features of my motor invention can be well understood from a detailed description of this specific signal motor, I shall here give such a detailed description of the motor as a signal motor; without, however, intending to limit the motor to such combination or use.

The objects of the invention will be best understood from the following detailed specification; but it may be mentioned here that a general object is to produce an efficient motor having a steady torque and relatively heavy pull at very slow operating speed and capable of operating smoothly at slow speed; and to produce a motor capable of efficient operation when reversed to produce an oscillatory motion. There are many other objects and corresponding features of accomplishment of the motor invention but they will be best understood from the following detailed description of a preferred form of the motor mechanism as adapted to and embodied in an oscillatory signal mechanism; and for this purpose such mechanisms are illustrated in the accompanying drawings, wherein:—

Fig. 1 is a side elevation of the motor; Fig. 2 is a vertical longitudinal section taken as indicated by lines 2—2 on Fig. 3; Fig. 3 is a transverse section taken as indicated by line 3—3 on Fig. 2; and Fig. 4 is a fragmentary plan of the motor.

In the drawings the numeral 10 designates a suitable base plate upon which the whole mechanism may be mounted. Upon this base plate are erected a pair of upright plates 11 and 12, which carry the major part of the motor mechanism and afford a mounting for control switches, etc. The hollow main shaft 13 of the motor mechanism is carried in anti-friction bearings 14 in plates 11 and 12. The armature and field and commutator of the motor mechanism are mounted between the two plates 11 and 12; and the shaft 13 may extend behind the plate 12 to there carry controlling switch mechanism.

A non-magnetic bushing 20 is rigidly mounted on shaft 13 and carries a circular iron plate 21 upon which the several armature cores 22 are rigidly mounted and carried. These armature cores 22 extend axially from plate 21 and are provided with windings 23. These windings 23 are connected together and connected to conductor bars 24 which lead to commutator bars 25; the windings and connections being in the ordinary and well known manner for a four pole motor. Conductor bars 24 and commutator bars 25 are preferably integral; the commutator being formed by the bars 25, supported at their inner ends by bars 24 which are screwed or otherwise set on the insulating plate or disc 26, and supported at their outer ends on a disc 27. A very simple and inexpensive commutator is thus made.

At their ends, the armature cores 22 carry a magnetic armature ring 30, secured to the armature cores so as to be rigidly carried by the armature cores and so as to properly space the armature cores apart at their ends. This armature ring 30 is carried in proximity to the four field poles 31 which are rigidly mounted upon the plate 11. These field poles are segmental in shape as shown in Fig. 3, and to them are secured the field cores 32. These field cores extend also axially of the machine and at their other ends carry four smaller pole pieces 33 which stand close to the magnetic armature plate 21. The magnetic gap between pole pieces 33 and plate 21 is as small as practicable; and the magnetic gap between pole pieces 31 and armature ring 30 is also as small as is practicable in a machine of this character. Armature ring 30 may have a flange or lip 34 overhanging pole pieces 31 to reduce magnetic leakage. Armature ring 30 and plate 21 are of iron of high reluctance; and ring 30 is of small cross-section. This is to prevent the magnetism generated by the armature magnet coils from having a magnetic "short circuit" through the armature structure itself; the high reluctance makes a condition that causes the magnetic lines of force to pass to and through the pole pieces 31 and 33 rather than through parts 30 and 21. There are four sets of magnetic field poles 31, 33. Each set is equipped with two cores 32 (in parallel) with suitable windings 35 which are so connected (for each pole) that the magnetism produced is either south or north as the case may be. The reason for this construction is to reduce radial dimension of the motor. The pole pieces themselves are alternately of north and south polarity.

Preferably only two sets of brushes 40 are used on the commutator 25, the armature windings being cross-connected in the usual and well known manner. Enough has now been described to show, without the necessity of further detailed explanation, how the mechanism just described may act as a rotating motor. It will be seen that the armature, the revolving part, is relatively large; being so not only on account of the design in general, but also on account of its being outside the field rather than inside. The armature being thus relatively large, its several parts which are located at a comparatively great distance from the center of rotation lend largely to the inertia of the machine, and facilitate its steadiness and smoothness of action at slow speed. This smoothness of action is also facilitated by the fact that the field has eight poles and that the armature has a large number of coils, all active at all times. And, in spite of the large number of coils, the armature is easily repaired. Being at the outside of the machine, the armature coils may be easily removed; and one or even several of them may be removed, for repairs, etc., without seriously impairing the action of the machine; the voltage on the machine being adjusted to suit the lesser number of armature coils. The field coils are relatively heavily wound so that there is little liability of their being damaged. The armature and field windings are usually connected up in series.

While I have described my machine in detail and specifically I have given this particular and full description of a preferred form for the purpose of rendering my invention fully intelligible in its broad as well as specific features, and not at all for the purpose of limiting my invention to the specific mechanisms here set forth. Rather do I conceive this invention to be broad in its scope and not limited except as appears in the following claims which are to be interpreted broadly to the invention as well as specifically to the particular embodiment of it here described.

Having described a preferred form of the invention, I claim:

1. A motor mechanism embodying a shaft, a stationary supporting member, a plurality of spaced field pole pieces supported on the member around the shaft, field cores and windings extending from the field pole pieces in a direction parallel to the shaft, pole pieces mounted on the ends of the cores, a magnetic ring plate mounted on the shaft near one set of pole pieces, armature cores and coils mounted on the ring plate and extending parallel to the shaft, and an armature ring of magnetic metal mounted on the ends of the armature cores and supported thereby near the other set of the field pole pieces.

2. A motor mechanism embodying a shaft, a stationary supporting member, a plurality of spaced field pole pieces supported on the member around the shaft, field cores and windings extending from the field pole pieces in a direction parallel to the shaft, pole pieces mounted on the ends of the cores, a magnetic plate mounted on the shaft near the second mentioned pole pieces, and with a small magnetic gap between said pole pieces and plate, armature cores and coils mounted on the plate in circular spaced arrangement outside the field coils and extending parallel to the shaft, and an armature ring of magnetic metal mounted on the ends of the armature cores and supported thereby near one set of the field pole pieces, the pole pieces being segmental shaped and the armature ring lying close to them in an axial direction and having a flange which overlies their circumferences.

3. A motor mechanism embodying a shaft, a stationary supporting member, a plurality of spaced field pole pieces supported on the member around the shaft, field cores and windings extending from the field pole pieces in a direction parallel to the shaft, pole pieces mounted on and carried by the ends of the cores, a magnetic ring plate mounted on the shaft near the second mentioned pole pieces, armature cores and coils mounted on the plate in circular spaced arrangement outside the field coils and extending parallel to the shaft, and an armature ring of magnetic metal mounted on the ends of the armature cores and supported thereby near the first mentioned set of the field pole pieces, said armature ring having high magnetic reluctance.

4. A motor mechanism embodying a shaft, a stationary supporting member, a plurality of spaced field pole pieces supported on the member around the shaft, field cores and windings extending from the field pole pieces in a direction parallel to the shaft, pole pieces mounted on and carried by the ends of the cores, a magnetic ring plate mounted on the shaft near the second mentioned pole pieces, and with a small magnetic gap between said pole pieces and plate, armature cores and coils mounted on the plate in circular spaced arrangement outside the field coils and extending parallel to the shaft, and an armature ring of magnetic metal mounted on the ends of the armature cores and supported thereby near the first mentioned set of the field pole pieces, the pole pieces being segmental shaped and the armature ring lying close to them in an axial direction and having a flange which overlies their circumferences, said armature ring having high magnetic reluctance.

5. A motor mechanism embodying a shaft, a stationary frame, a plurality of spaced field pole pieces arranged around the shaft, field coils and cores extending from the pole pieces parallel with the shaft, armature cores and coils mounted around the shaft and extending parallel to the shaft, and a magnetic armature ring connected to the armature cores and lying near the field pole pieces.

6. A motor mechanism embodying a shaft, a stationary frame, a plurality of spaced field pole pieces arranged around the shaft, field coils and cores extending from the pole pieces parallel with the shaft, armature cores and coils mounted around the shaft and extending parallel to the shaft, and a magnetic armature ring connected to the armature cores and lying near the field pole pieces, said armature ring being continuous and having high magnetic reluctance.

7. A motor mechanism embodying a shaft, a plurality of spaced field pole pieces arranged around the shaft, field coils and cores extending from the field pole pieces in a direction parallel to the shaft, pole pieces mounted on the extended ends of the cores, a magnetic armature ring plate arranged near the second mentioned field pole pieces, armature cores and coils mounted on the plate and extending therefrom parallel to the shaft, and a magnetic armature ring on the extended ends of the armature cores near the first mentioned field pole pieces.

8. A motor mechanism embodying a shaft, a plurality of spaced field pole pieces arranged around the shaft, field coils and cores extending from the field pole pieces in a direction parallel to the shaft, pole pieces mounted on the extended ends of the cores, a magnetic armature ring plate arranged near the second mentioned field pole pieces, armature cores and coils mounted on the plate and extending therefrom parallel to the shaft, and a magnetic armature ring on the extended ends of the armature cores near the first mentioned field pole pieces, said armature ring and plate having high magnetic reluctance.

9. A motor mechanism embodying a stationary frame and a shaft, and two elements, one mounted on the frame and the other on the shaft; each element comprising a set of circularly spaced cores arranged around and extending parallel with the shaft, and windings around the several cores; one element having separated pole pieces at the ends of its cores, and the other element having at the ends of its cores a continuous magnetic ring arranged close to the pole pieces and of a material having relatively high magnetic reluctance.

In witness that I claim the foregoing I have hereunto subscribed my name this 6th day of July, 1921.

MARY W. THOMPSON,
*Executrix of Robert R. Thompson, deceased.*